United States Patent
Strode et al.

(10) Patent No.: US 9,325,500 B2
(45) Date of Patent: Apr. 26, 2016

(54) PROVIDING SUPPORT FOR MULTIPLE AUTHENTICATION CHAINS

(75) Inventors: Ray Strode, Somerville, MA (US); William Jon McCann, Baltimore, MD (US)

(73) Assignee: Red Hat, Inc., Raleigh, NC (US)

( * ) Notice: Subject to any disclaimer, the term of this patent is extended or adjusted under 35 U.S.C. 154(b) by 972 days.

(21) Appl. No.: 12/716,924

(22) Filed: Mar. 3, 2010

(65) Prior Publication Data

US 2011/0219439 A1 Sep. 8, 2011

(51) Int. Cl.
*G06F 7/04* (2006.01)
*H04L 9/32* (2006.01)

(52) U.S. Cl.
CPC *H04L 9/32* (2013.01); *H04L 9/326* (2013.01); *H04L 9/3215* (2013.01); *H04L 9/3231* (2013.01)

(58) Field of Classification Search
CPC ......... H04L 9/32; H04L 9/3215; H04L 9/326; H04L 9/3231
USPC .......... 713/150, 155, 168–170; 726/2, 3, 5, 9, 726/10, 28, 4; 709/223, 225
See application file for complete search history.

(56) References Cited

U.S. PATENT DOCUMENTS

| | | | |
|---|---|---|---|
| 6,766,407 B1 * | 7/2004 | Lisitsa et al. | 710/316 |
| 6,928,547 B2 * | 8/2005 | Brown et al. | 713/186 |
| 6,950,935 B1 * | 9/2005 | Allavarpu et al. | 713/168 |
| 7,206,934 B2 * | 4/2007 | Pabla et al. | 713/168 |
| 7,330,971 B1 * | 2/2008 | Kukreja et al. | 713/168 |
| 7,610,107 B2 * | 10/2009 | Scharnick et al. | 700/22 |
| 7,620,980 B1 * | 11/2009 | Wood et al. | 726/14 |
| 8,006,294 B2 * | 8/2011 | Kikuchi | 726/8 |
| 8,171,288 B2 * | 5/2012 | Brown et al. | 713/168 |
| 2004/0034784 A1 * | 2/2004 | Fedronic et al. | 713/186 |
| 2004/0128198 A1 * | 7/2004 | Register et al. | 705/14 |
| 2008/0095331 A1 * | 4/2008 | Wlasiuk | 379/88.14 |
| 2008/0155662 A1 * | 6/2008 | Vykunta | 726/5 |
| 2009/0292829 A1 * | 11/2009 | Mizuho | 710/11 |
| 2009/0328147 A1 * | 12/2009 | Goel et al. | 726/3 |
| 2010/0085152 A1 * | 4/2010 | Fukuda et al. | 340/5.82 |

OTHER PUBLICATIONS

Uchil, M. "Authentication Service Architecture", Sun Microsystems, Inc. 2005. [retrieved on May 20, 2012 from Internet "http://java.net/downloads/opensso/docs/architecture/auth_arch.pdf"].*

Chan, S.; Andrews, M.; "Simplifying Public Key Credential Management Through Online Certificate Authorities and PAM", 2006. [retrieved on May 20, 2012 from Citeseer database].*

(Continued)

*Primary Examiner* — Saleh Najjar
*Assistant Examiner* — Peiliang Pan
(74) *Attorney, Agent, or Firm* — Lowenstein Sandler LLP

(57) ABSTRACT

A method and system to support multiple chains of authentication modules. The method may include receiving a user login request, and identifying multiple chains of authentication modules to be performed prior to allowing a user to login, where each chain of authentication modules is associated with a chain manager. The method further includes determining dependencies between chain managers, invoking the chain managers in the order defined by the dependencies, and responding to the user login request based on execution results of the authentication modules.

21 Claims, 6 Drawing Sheets

(56) References Cited

OTHER PUBLICATIONS

Dai, W.; Liu, J.; "Dynamic adaptive services in e-business environments", ARM '06 Proceedings of the 5th workshop on Adaptive and reflective middleware (ARM '06) ; 2006. Page 7 [retrieved on May 20, 2012 from ACM database].*

Dyrda, M.; Malawski, M.; Bubak, M.; Naqvi, S.;" Providing security for MOCCA component environment", Parallel & Distributed Processing, 2009. IPDPS 2009. IEEE International Symposium; Publication Year: 2009 , pp. 1-7 [retrieved on May 20, 2012 from IEEE database].*

* cited by examiner

PROVIDING SUPPORT FOR MULTIPLE AUTHENTICATION CHAINS

TECHNICAL FIELD

Embodiments of the present invention relate to user authentication. Specifically, embodiments of the invention relate to a method and system for supporting multiple chains of authentication modules.

BACKGROUND

Programs which grant users access to a system verify each user's identity through a process called authentication. Historically, each such program had its own way of performing the task of authentication. Pluggable authentication modules (PAM) is a mechanism to integrate multiple low-level authentication schemes into a high-level application programming interface (API). It allows programs that rely on authentication to be written independent of the underlying authentication scheme.

Typically, a PAM-based authentication process consists of a serial stack of authentication modules that have to run one after another in a very specific order. This arrangement does not provide sufficient flexibility to support different authentication requirements of various systems.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION

Embodiments of a method and system to support multiple chains of authentication modules are described herein. In one embodiment, a login manager residing on a client computer system receives a user login request, and identifies multiple chains of authentication modules that should be performed in order to allow a user to login, where each chain of authentication modules is associated with a chain manager that facilitates execution of respective authentication modules. The login manager determines dependencies between chain managers, invokes the chain managers in the order defined by the dependencies, and responds to the user login request based on execution results of the authentication modules.

Embodiments of the invention provide a flexible authentication mechanism that allows multiple chains of authentication modules to be executed in parallel with each chain of authentication modules being built dynamically using a modular approach. The order in which the authentication module chains are executed can be configured, and new authentication module chains can be added as needed.

Figure 1:
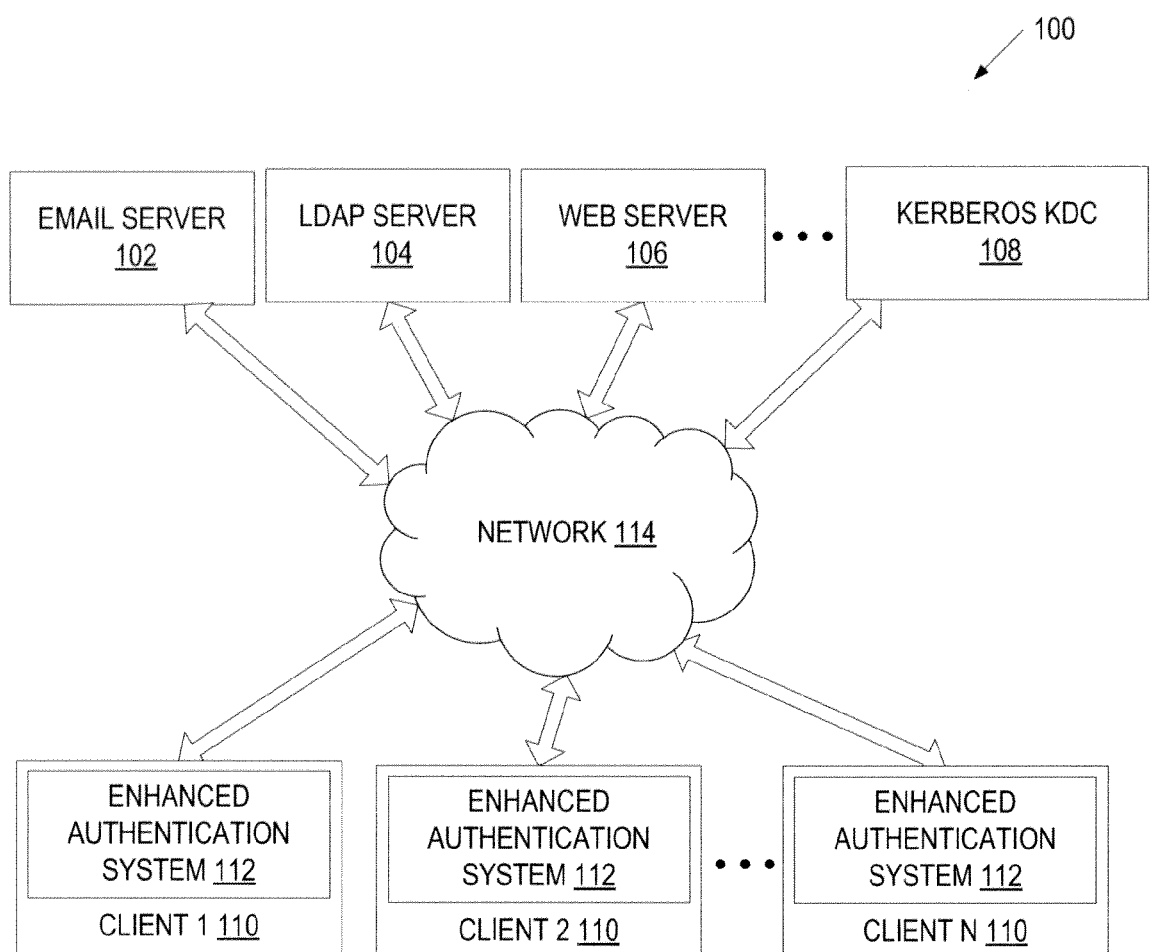
FIG. 1 illustrates an exemplary network architecture in which embodiments of the present invention may operate.

FIG. 1 illustrates an exemplary network architecture 100 in which embodiments of the invention may operate. The network architecture 100 includes multiple client computer systems ("clients") 110 coupled to various servers 102 through 108 via a network 114. The client computers 110 may be desktop computers, personal computers, mobile phones, personal digital assistants (PDAs), appliances, and the like. The servers may include, for example, an email server 102 providing email services to clients 110, a lightweight directory access protocol (LDAP) server 104 providing access to one or more LDAP directories for clients 110, a web server 106 providing various web services to clients 110, a Kerberos key distribution center (KDC) 108 that allows clients 110 to prove their identity to one another in a secure manner, etc. Each server may include one more computers such as server computers, gateway computer, personal computers, laptops, etc.

When users of clients 110 attempt to login, they are authenticated for access to different systems. For example, a user may first be authenticated for access to his or her local machine (client 110), then the user may be authenticated for access to each of the servers 102, 104 and 106, further the user may be authenticated for access to the KDC 108, and so on. Each type of authentication may be performed using different authentication modules such as pluggable authentication modules (PAM). For example, a user may be authenticated for access to a local machine using several PAM Unix modules that may perform fingerprint authentication, smart card authentication, one-time password (OTP) token authentication, face recognition authentication, password authentication, or any combination of the above.

In one embodiment, each client 100 hosts an extended authentication system 112 that provides support for multiple chains of authentication modules. In particular, contrary to a conventional PAM system having a serial stack of authentication modules that run one after another in a very specific order, the extended authentication system 112 includes multiple stacks of authentication modules that can run in parallel. The order in which the stacks of authentication modules are executed is configurable (e.g., by a system administrator) and can be easily modified according to the authentication requirements of a certain system. Each stack of authentication modules can be built dynamically using a modular approach. In addition, in some embodiments, a combination of stacks can be built dynamically as well. Programs that use authentication mechanisms provided by the enhanced authentication system 112 can continue utilizing a modified stack of authentication modules and/or a modified combination of authentication module stacks, without being recompiled or otherwise modified.

Figure 2:
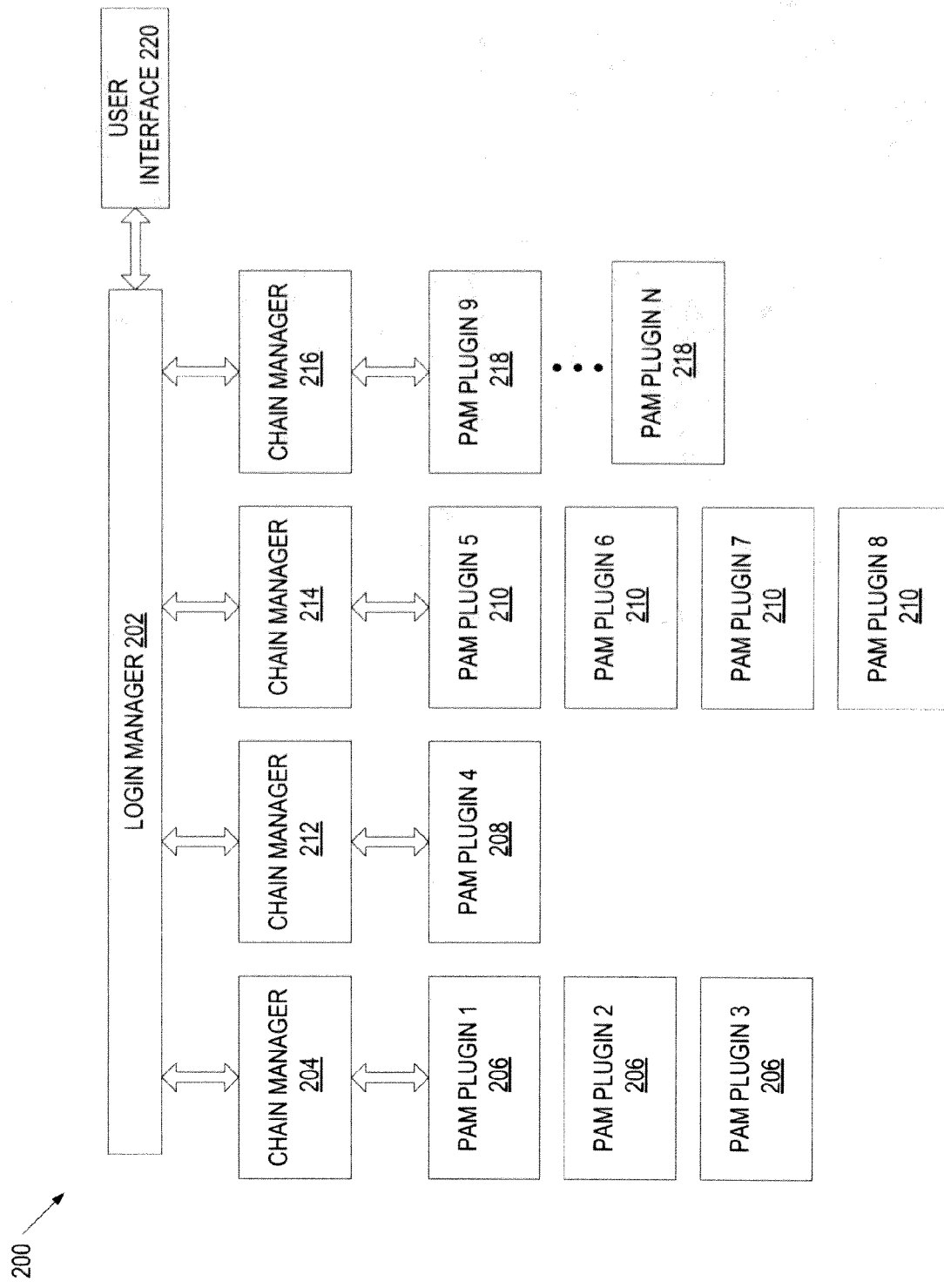
FIG. 2 is a block diagram of one embodiment of an enhanced pluggable authentication module (PAM) system.

FIG. 2 is a block diagram of an enhanced authentication system 200 that utilizes PAM modules. The enhanced authentication system 200 includes multiple chain managers that control respective chains (or stacks) of authentication modules. For example, the first chain may be controlled by a chain manager 204 and may include PAM plugins 206 (e.g., PAM modules evaluating user access to a local machine), the second chain may be controlled by a chain manager 212 and may include a PAM plugin 208 (e.g., a PAM module evaluating user access to an email server), the third chain may be controlled by a chain manager 214 and may include PAM plugins 210 (e.g., APM modules for Kerberos authentication), and the fourth chain may be controlled by a chain manager 216 and may include PAM plugins 218 (e.g., PAM modules evaluating user access to an LDAP server). It should be noted that the system 200 may include more or less chains and more or less PAM plugins in any chain without loss of generality.

Each chain manger invokes respective PAM plugins based on a specified order. In one embodiment, each chain manager has a configuration file (e.g., a text file) that identifies respective PAM plugins, specifies the order in which these PAM plugins should be executed, and defines the effect of the execution result of a PAM plugin (e.g., whether or not the PAM plugin result must be successful for authentication to continue). A system administrator may modify the configuration file to add new PAM plugins to the chain, remove existing PAM plugins from the chain, change the order of execution, or change the effect of the result of a PAM plugin on the authentication decision). Once the configuration file is modified, this modification is reflected in the functionality provided by the corresponding chain of the PAM plugins, without requiring any changes to its chain manager or other components of the system 200, or to programs utilizing the system 200 for authentication.

The chain managers 204, 212, 214 and 216 are controlled by a login manager 202. The login manager 202 defines the dependencies between the chain managers. In particular, the dependencies may identify the chains that should be executed in parallel and may provide conditions for executing a specific chain. For example, the dependencies may specify that the first and second chains should be executed in parallel in response to a user login request, and that the third and fourth chains should be executed in parallel after at least one of the first and second chains successfully completes its execution. The dependencies may also specify what execution results should cause a user login request to be allowed or rejected.

The dependencies between the chain managers may be configured by a system administrator using a user interface 214. The dependencies may be stored in a designated data structure such as a file, a table, etc. In some embodiments, the chain managers are plugins that can be easily added or deleted based on input provided by a system administrator via the user interface 214. In addition, the system administrator can specify the dependencies for the new chain manager via the user interface 214. The resulting configuration information can be immediately used by the login manager 202 without requiring any changes to the login manager 202 or other components of the system 200, or to programs utilizing the system 200 for authentication.

In response to a user login request, the login manager 202 identifies current chain managers and dependencies between the chain managers, and determines the order in which the chain managers should be invoked based on the dependencies. The login manager 202 then invokes the chain managers in this order and waits for execution results from the chain managers. Depending on the execution results, the login manager 202 may reject the user login request or allow the user to login.

Figure 3:
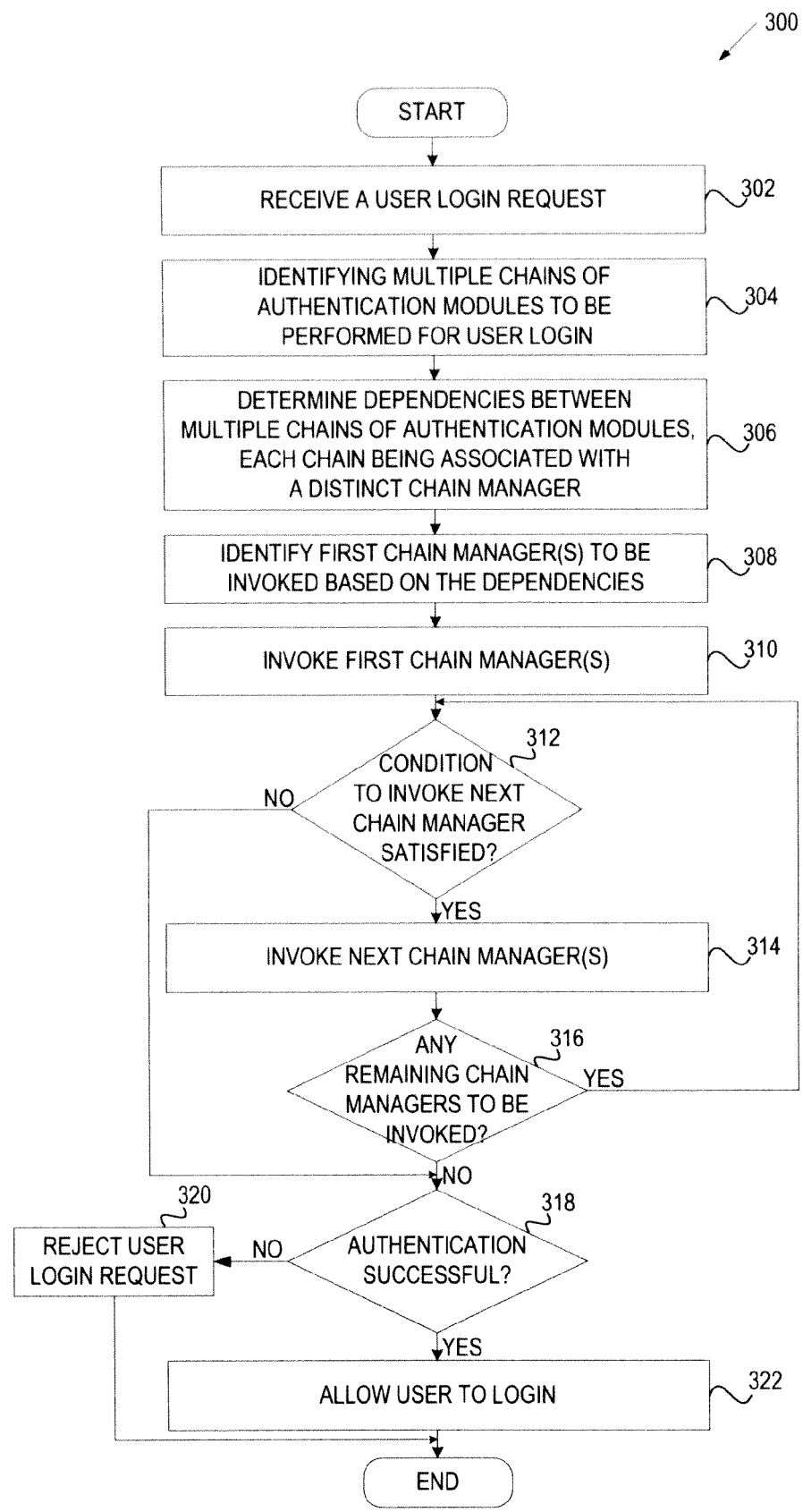
FIG. 3 is a flow diagram of one embodiment of an authentication method that supports multiple chains of authentication modules.

FIG. 3 is a flow diagram of one embodiment of a method 300 for supporting multiple chains of authentication modules. The method 300 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 300 is performed by an enhanced authentication system 112 of FIG. 1.

Referring to FIG. 3, method 300 begins with an enhanced authentication system receiving a user login request (block 302). At block 304, a login manager of the enhanced authentication system identifies chain managers that control authentication modules to be performed for user login. The authentication modules may be PAM plugins that are intended for different types of user authentication.

At block 306, the login manager determines dependencies between the chain managers. The dependencies specify which authentication module chains should be performed in parallel and conditions for invoking the chain managers.

At block 308, the login manager identifies, based on the dependencies, the first chain manager(s) that should be invoked in response to the user login request. At block 310, the login manager invokes the first chain manager(s). Once the first chain managers are invoked, they cause respective authentication modules to execute. Once the execution of the respective authentication modules is completed (successfully or unsuccessfully), the first chain managers report the execution results to the login manager.

At block 312, the login manager determines whether a condition to invoke a next chain manager is satisfied. A condition may be, for example, a successful completion of authentication module chains controlled by the first chain managers or by one or more of the first chain managers, a completion (successful or unsuccessful) of the authentication module chains controlled by the first chain managers or one or more of the first chain managers, a successful completion of a specific module(s) in the chain(s) controlled by the first chain managers, a completion (successful or unsuccessful) of a specific module(s) in the chain(s) controlled by the first chain managers, etc.

If the condition is not satisfied, the login manager determines whether the authentication can still be considered successful (block 318). If so (e.g., when the configuration information of the login manager specifies that the user should be allowed to login if the chains controlled by the first chain managers complete successfully), the user is allowed to login (block 322). If not, the login manager rejects the user request to login (block 320).

If the condition to invoke a next chain manager(s) is satisfied, the login manager invokes the next chain manager(s) (block 314) and waits for execution results from the next chain manager(s). Upon receiving the execution results, the login manager determines whether there are any remaining chain managers to be invoked (block 316). If so, method returns to block 312. If not, the login manager determines whether the authentication can be considered successful (block 318).

If the authentication can be considered successful, the user is allowed to login (block 322). If not, the login manager rejects the user request to login (block 320).

Figure 4:
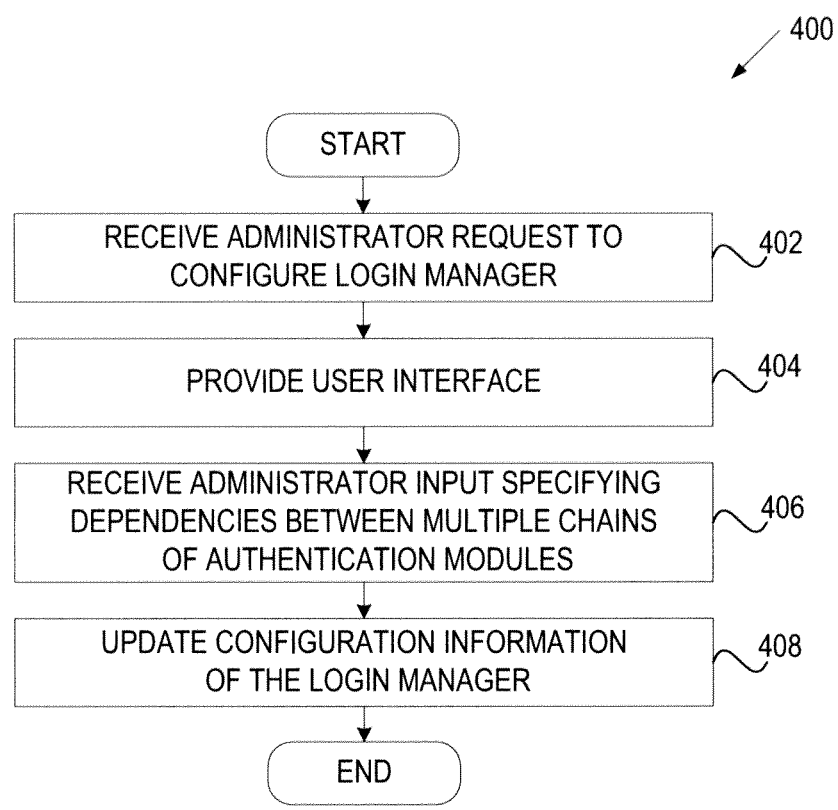
FIG. 4 is a flow diagram of one embodiment of a method for configuring a login manager.

FIG. 4 is a flow diagram of one embodiment of a method 400 for configuring a login manager. The method 400 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 400 is performed by an enhanced authentication system 112 of FIG. 1.

Referring to FIG. 4, method 400 begins with receiving a system administrator request to configure a login manager (block 402). At block 404, the enhanced authentication system provides a user interface (e.g., a graphical user interface (GUI)) that allows the system administrator to create or update the configuration information of the login manager. At block 406, the enhanced authentication system receives, via the user interface, system administrator input specifying dependencies between multiple chains of authentication modules. In one embodiment, the system administrator input also indicates what execution results should constitute a successful authentication and what execution results should not constitute a successful authentication. At block 408, the enhanced authentication system updates the configuration information of the login manager. The configuration information may be stored in a file, a database, or any other data structure.

Figure 5:
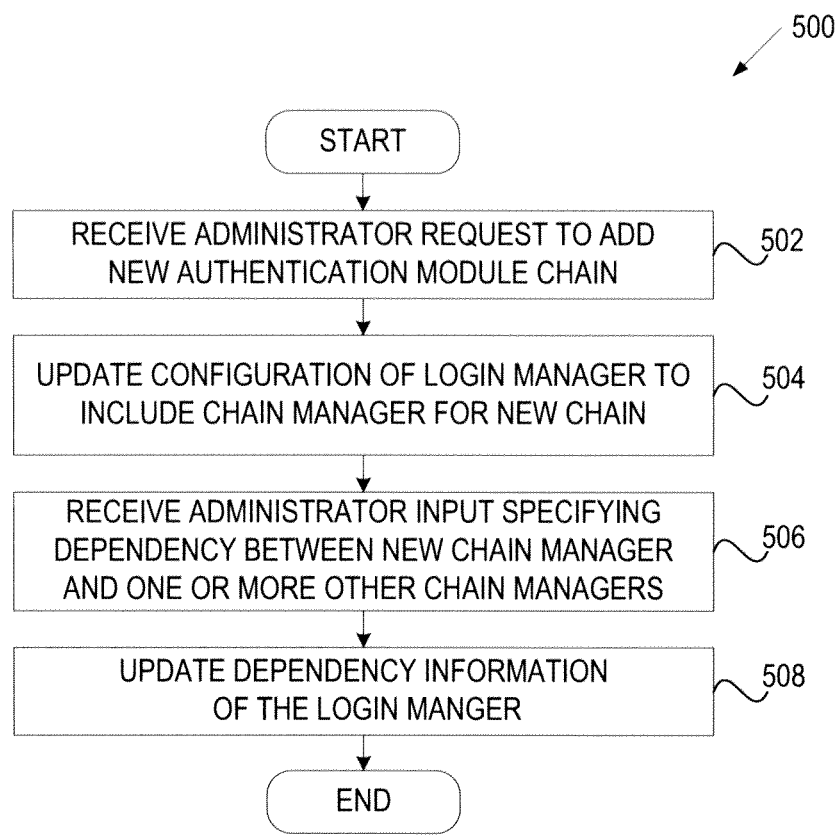
FIG. 5 is a flow diagram of one embodiment of a method for adding a new chain of authentication modules to a login manager.

FIG. 5 is a flow diagram of one embodiment of a method 500 for adding a new chain of authentication modules to a login manager. The method 500 may be performed by processing logic that may comprise hardware (e.g., circuitry, dedicated logic, programmable logic, microcode, etc.), software (e.g., instructions run on a processing device to perform hardware simulation), or a combination thereof. In one embodiment, the method 500 is performed by an enhanced authentication system 112 of FIG. 1.

Referring to FIG. 5, method 500 begins with receiving a system administrator request to add a new authentication module chain to a login manager (block 502). At block 504, the enhanced authentication system updates configuration information of the login manager to include a chain manager associated with the new authentication module chain. At block 506, the enhanced authentication system receives, via the user interface, system administrator input specifying dependencies between the new chain manager and other chain managers. At block 508, the enhanced authentication system updates the configuration information of the login manager with new dependencies.

Figure 6:
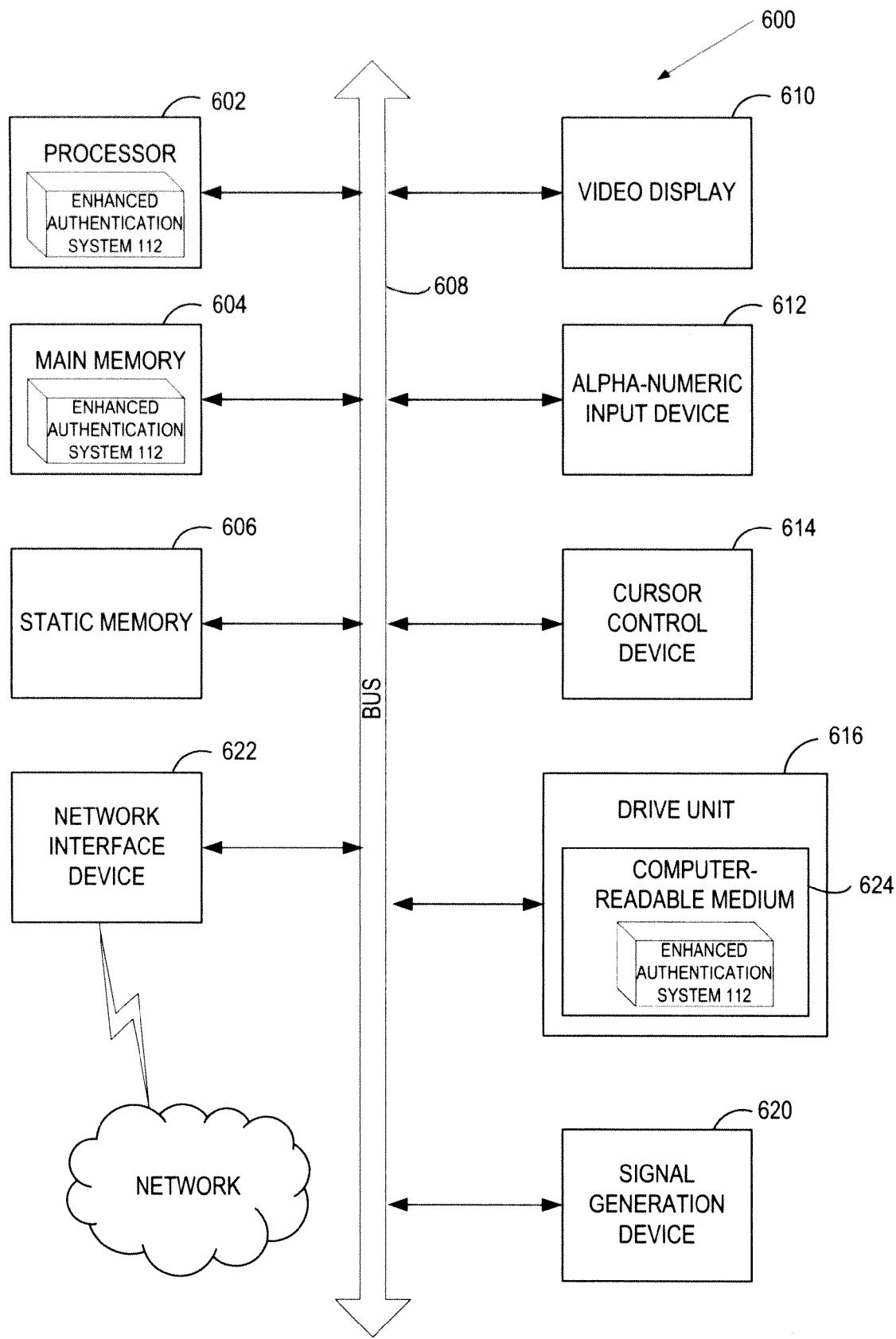
FIG. 6 is a block diagram of one embodiment of a computer system that supports multiple chains of authentication modules.

FIG. 6 is a block diagram of one embodiment of a computer system 600 that supports multiple chains of authentication modules. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server machine or a client machine in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes one or more processing devices 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Processing devices 602 represent one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. Processing device 602 is configured to execute instructions for an enhanced authentication system 112 for performing the operations and steps discussed herein.

The computer system 600 may further include a network device 110 (e.g., NIC, Ethernet network card, etc.). The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions for an enhanced authentication system 112 embodying any one or more of the methodologies or functions described herein. The instructions for an enhanced authentication system 112 may also reside, completely or at least partially, within the main memory 604 and/or within the processing device 602 during execution thereof by the computer system 600, the main memory 604 and the processing device 602 also constituting machine-readable storage media. The instructions for an enhanced authentication system 112 may further be transmitted or received over a network 618 via the network device 110.

The computer-readable storage medium 624 may also be used to store the instructions for an enhanced authentication system 112 persistently. While the computer-readable storage medium 626 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The components and other features described herein (for example in relation to FIG. 1) can be implemented as discrete hardware components or integrated in the functionality of hardware components such as ASICS, FPGAs, DSPs or similar devices. In addition, these components can be implemented as firmware or functional circuitry within hardware devices. Further, these components can be implemented in any combination of hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "identifying," "responding," "providing" or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for supporting multiple chains of authentication modules has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, comprising:

receiving, by a client computing system, a user login request;

identifying, by the client computing system, a plurality of chains of authentication modules to be performed prior to allowing a user to login, each of the plurality of chains being associated with a respective chain manager of a plurality of chain managers, each of the plurality of chains having a plurality of authentication modules, each of the plurality of chain managers having configuration information identifying authentication modules of a respective chain, a module execution order of the authentication modules of the respective chain, and an effect of an execution result of each of the authentication module;

determining, by a processing device of the client computing system, current dependencies between the plurality of chain managers;

determining a chain execution order for the plurality of chains of authentication modules based on the current dependencies between the plurality of chain managers, wherein the chain execution order indicates a parallel execution of at least two of the plurality of chains of authentication modules, each of the at least two of the plurality of chains of authentication modules having a modifiable number of the plurality of authentication modules, and corresponding to at least two of the plurality of chain managers with modifiable dependencies;

executing the plurality of chains of authentication modules in the chain execution order; and responding to the user login request based on execution results of the authentication modules.

2. The method of claim 1 wherein each authentication module is a pluggable authentication module (PAM) plugin.

3. The method of claim 1 wherein the authentication modules perform at least one of a local machine authentication, a local area network authentication, a directory server authentication, an email server authentication, or a Kerberos authentication.

4. The method of claim 3 wherein the authentication modules comprise at least one of a user name and password module, a fingerprint module, a smart card module, a one-time password (OTP) token, or a face recognition module.

5. The method of claim 1 wherein responding to the user login request comprises:

granting the user login request if authentication of the user by an authentication module executed last is successful; and rejecting the user login request if authentication of the user by one of the authentication modules being executed is unsuccessful.

6. The method of claim 1 further comprising:

providing a user interface to allow another user to configure dependencies between chain managers.

7. The method of claim 1 further comprising:

providing a user interface to allow another user to add a new chain manager.

8. The method of claim 7 further comprising:

receiving user input specifying dependencies between the new chain manager and one or more existing chain managers.

9. The method of claim 1 wherein each chain manager is a plugin.

10. A non-transitory computer readable storage medium comprising instruction, which when executed by a processor, cause the processor to perform a method comprising:

receiving, by a client computing system, a user login request;

identifying, by the client computing system, a plurality of chains of authentication modules to be performed prior to allowing a user to login, each of the plurality of chains being associated with a respective chain manager of a plurality of chain managers, each of the plurality of chains having a plurality of authentication modules, each of the plurality of chain managers having configuration information identifying authentication modules of a respective chain, a module execution order of the authentication modules of the respective chain, and an effect of an execution result of each of the authentication module;

determining, by the processor of the client computing system, current dependencies between the plurality of chain managers;

determining a chain execution order for the plurality of chains of authentication modules based on the current dependencies between the plurality of chain managers, wherein the chain execution order indicates a parallel execution of at least two of the plurality of chains of authentication modules, each of the at least two of the plurality of chains of authentication modules having a modifiable number of the plurality of authentication modules, and corresponding to at least two of the plurality of chain managers with modifiable dependencies;

executing the plurality of chains of authentication modules in the chain execution order; and responding to the user login request based on execution results of the authentication modules.

11. The computer readable storage medium of claim 10 wherein each authentication module is a pluggable authentication module (PAM) plugin.

12. The computer readable storage medium of claim 10 wherein the authentication modules perform at least one of a local machine authentication, a local area network authentication, a directory server authentication, an email server authentication, or a Kerberos authentication.

13. The computer readable storage medium of claim 12 wherein the authentication modules comprise at least one of a user name and password module, a fingerprint module, a smart card module, a one-time password (OTP) token, or a face recognition module.

14. The computer readable storage medium of claim 10 wherein responding to the user login request comprises:

granting the user login request if authentication of the user by an authentication module executed last is successful; and rejecting the user login request if authentication of the user by one of the authentication modules being executed is unsuccessful.

15. The computer readable storage medium of claim 10 further comprising:

providing a user interface to allow another user to configure dependencies between chain managers; and providing a user interface to allow the another user to add a new chain manager.

16. The computer readable storage medium of claim 10 wherein each chain manager is a plugin.

17. A system comprising:

a memory; and a processor, coupled to the memory to:

receive a user login request;

identify a plurality of chains of authentication modules to be performed prior to allowing a user to login, each of the plurality of chains being associated with a respective chain manager of a plurality of chain managers, each of the plurality of chains having a plurality of authentication modules, each of the plurality of chain managers having configuration information identifying authentication modules of a respective chain, a module execution order of the authentication modules of the respective chain, and an effect of an execution result of each of the authentication module;

determine current dependencies between the plurality of chain managers;

determine a chain execution order for the plurality of chains of authentication modules based on the current dependencies between the plurality of chain managers, wherein the chain execution order indicates a parallel execution of at least two of the plurality of chains of authentication modules, each of the at least two of the plurality of chains of authentication modules having a modifiable number of the plurality of authentication modules, and corresponding to at least two of the plurality of chain managers with modifiable dependencies;

execute the plurality of chains of authentication modules in the chain execution order; and respond to the user login request based on execution results of the authentication modules.

18. The system of claim 17 wherein each authentication module is a pluggable authentication module (PAM) plugin performing at least one of a local machine authentication, a local area network authentication, a directory server authentication, an email server authentication, or a Kerberos authentication.

19. The system of claim 18 wherein the authentication modules comprise at least one of a user name and password module, a fingerprint module, a smart card module, a one-time password (OTP) token, or a face recognition module.

20. The system of claim 17 further comprising:

a user interface to allow another user to configure dependencies between chain managers, and to add a new chain manager.

21. The system of claim 17 wherein each chain manager is a plugin.

* * * * *